(No Model.)
J. B. WHITE.
STOP FOR EXPANSION JOINTS.
No. 337,037. Patented Mar. 2, 1886.
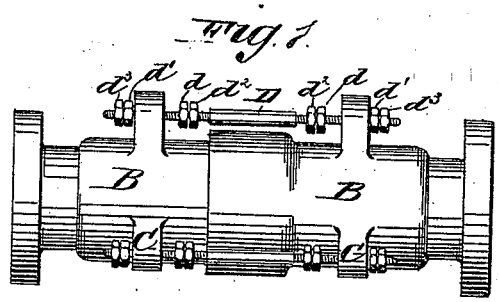
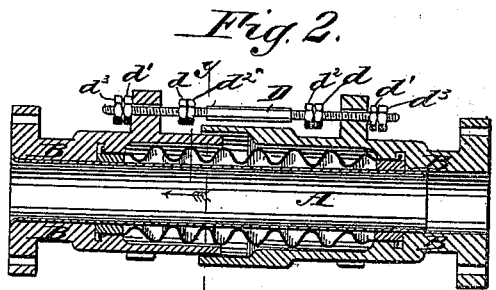
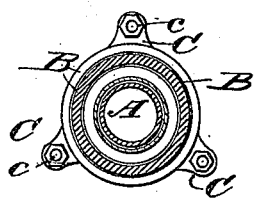
WITNESSES:
INVENTOR

UNITED STATES PATENT OFFICE.

JOSEPH B. WHITE, OF BROOKLYN, NEW YORK.

STOP FOR EXPANSION-JOINTS.

SPECIFICATION forming part of Letters Patent No. 337,037, dated March 2, 1886.

Application filed July 16, 1885. Serial No. 171,757. (No model.)

*To all whom it may concern:*

Be it known that I, JOSEPH B. WHITE, of the city of Brooklyn, county of Kings, and State of New York, have invented a certain new and useful Improvement in Stops for Expansion-Joints; and I do hereby declare the following to be a full, clear, and exact description thereof, reference being had to the accompanying drawings, which form part of this specification, and in which—

Figure 1 is a side elevation of an expansion-joint provided with my improvement. Fig. 2 is a longitudinal sectional view of the same, and Fig. 3 is a transverse sectional view thereof on the line Y Y.

In a line of pipe subject to changes of length, and in which more than one expansion-joint is to be placed, unless some method is adopted for confining the movement of each expansion-joint within certain limits, the movement arising from the expansion and contraction of the entire length of the line of pipe will occur in the expansion-joint which offers the least resistance to compression or extension, and that joint in consequence will be strained, ruptured, or broken.

The object of my invention is to provide means whereby the movement of each expansion-joint in a line of pipe such as described will be confined within safe and certain limits that may be definitely varied at pleasure to suit varying conditions, and the necessity of anchoring the line of pipes at frequent intervals between the expansion-joints will be obviated; and to this end it consists of the construction, arrangement, and combination of parts, as hereinafter described, and more specifically pointed out in the claims.

In the drawings, A designates an expansion-joint consisting of corrugated tubing inclosed in flanged protecting shells or casings B B. Upon these shells are the lugs C C. As shown, there are three of these lugs placed equidistant around the circumference of each of the two shells, and they are so arranged upon the shells that when the different parts of the expansion-joint are in position the lugs will be about midway between the center and the ends of the expansion-joint, and the lugs on one shell will be directly in line with the corresponding lugs on the other shell. The lugs C C are provided with the bolt-holes $c\ c$, through which the bolts D D are inserted. These bolts are sufficiently long to project a short distance at each end beyond the lugs C C, and the bolt-holes $c\ c$ are sufficiently large to permit the bolts to pass through them freely. The bolts D D are threaded at both ends, to receive the nuts $d\ d\ d'\ d'$ and the jam-nuts $d^2\ d^2\ d^3\ d^3$, and the centers of the bolts are so shaped as to permit their being held firmly by a wrench, to prevent turning while the nuts are being screwed on. The nuts $d\ d$ are capable of being so adjusted upon the bolts D D that the inner side of the lugs C C will impinge against them when the expansion-joint is compressed as far as may be thought desirable, and the nuts $d'\ d'$ are capable of a like adjustment with respect to the outer sides of the lugs C C when the expansion-joint is drawn out. When the amount of movement which the expansion-joint is to be allowed to have has thus been determined, the jam-nuts $d^2\ d^2\ d^3\ d^3$ are screwed against the nuts $d\ d\ d'\ d'$, which are thus prevented from shifting their positions upon the bolts D D, or the nuts $d\ d\ d'\ d'$ may be locked in any other suitable manner desired.

The operation of my apparatus is as follows: When a line of pipe—as, for instance, a line of steam-pipe in which there have been placed several expansion-joints provided with my improvement—commences to expand, the longitudinal movement produced by the expansion will be first transmitted to the expansion-joint offering the least resistance to compression. That expansion-joint will be compressed, provided the expansion of the pipe is sufficient therefor, until the inner sides of the lugs C C impinge against the nuts $d\ d$, when the limit of movement allowed for that joint in that direction will have been reached and no further compression can occur therein. The movement will then be transmitted to the joint in the line that offers the next degree of resistance, and so on until the expansion of the pipe has all been compensated for. When the pipes contract, the operation is reversed. The expansion-joint which offers the least resistance to extension will, by the longitudinal movement produced by the contraction of the pipes, be drawn out until the outer sides of the lugs C C come into contact with the nuts $d'\ d'$. The movement will then be transmitted to the expansion-joint offering the next degree of resistance, and so on until the contraction of the pipes has all been compensated for.

I have shown and described my apparatus attached to an expansion-joint constructed of corrugated tubing; but I do not wish to confine the application of the improvement to expansion-joints of that description, because it can as readily and as advantageously be attached to ordinary stuffing-boxes or any other form of expansion-joint. Neither is it necessary to use three bolts with the corresponding nuts and lugs, as shown, to accomplish the object of the invention. Two bolts placed diametrically opposite each other would doubtless in many instances answer the purpose fully, and, on the other hand, if three were found to be insufficient a larger number could be provided.

Having thus fully set forth the nature and merits of my invention, what I claim as new is—

1. An expansion-joint provided with adjustable stops which limit the longitudinal movement of the expansion-joint, substantially as and for the purposes set forth.

2. An expansion-joint provided with lugs, bolts, and adjustable nuts with locking devices which limit the longitudinal movement of the expansion-joint, substantially as and for the purposes set forth.

3. In combination with the shells or casing of an expansion-joint, the lugs C C, provided with bolt-holes $c\ c$, bolts D D, and adjustable nuts $d\ d\ d'\ d'$, provided with suitable locking devices, substantially as and for the purposes set forth.

4. In an expansion-joint constructed with corrugated tubing, the combination of the lugs C C, provided with bolt-holes $c\ c$, bolts D D, and adjustable nuts $d\ d\ d'\ d'$, provided with locking devices, substantially as and for the purposes set forth.

J. B. WHITE.

Witnesses:
H. W. YORK,
C. M. FULLER.

Corrections in Letters Patent No. 337,037.

It is hereby certified that Letters Patent No. 337,037, granted March 2, 1886, upon the application of Joseph B. White, of Brooklyn, New York, for an improvement in "Stops for Expansion Joints," was erroneously issued to the inventor, as owner of the patent; that said Letters Patent should have been issued to *The New York Steam Company* as assignee of the entire interest; and that the proper corrections have been made in the files and records of the case in the Patent Office, and should be read in the Letters Patent that the same may conform thereto.

Signed, countersigned, and sealed this 16th day of March, A. D. 1886.

[SEAL.]

H. L. MULDROW,
*Acting Secretary of the Interior.*

Countersigned:
M. V. MONTGOMERY,
*Commissioner of Patents.*